A. DELL.
WINDSHIELD CLEANER.
APPLICATION FILED DEC. 31, 1920.
1,389,129.
Patented Aug. 30, 1921.
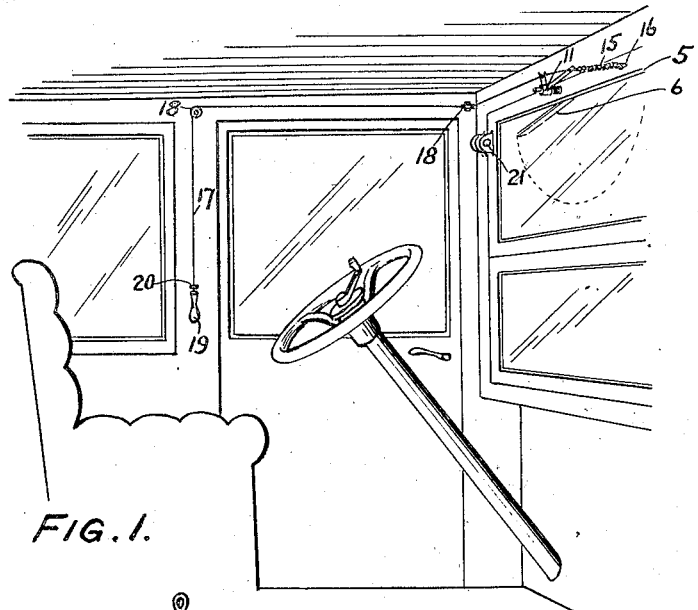
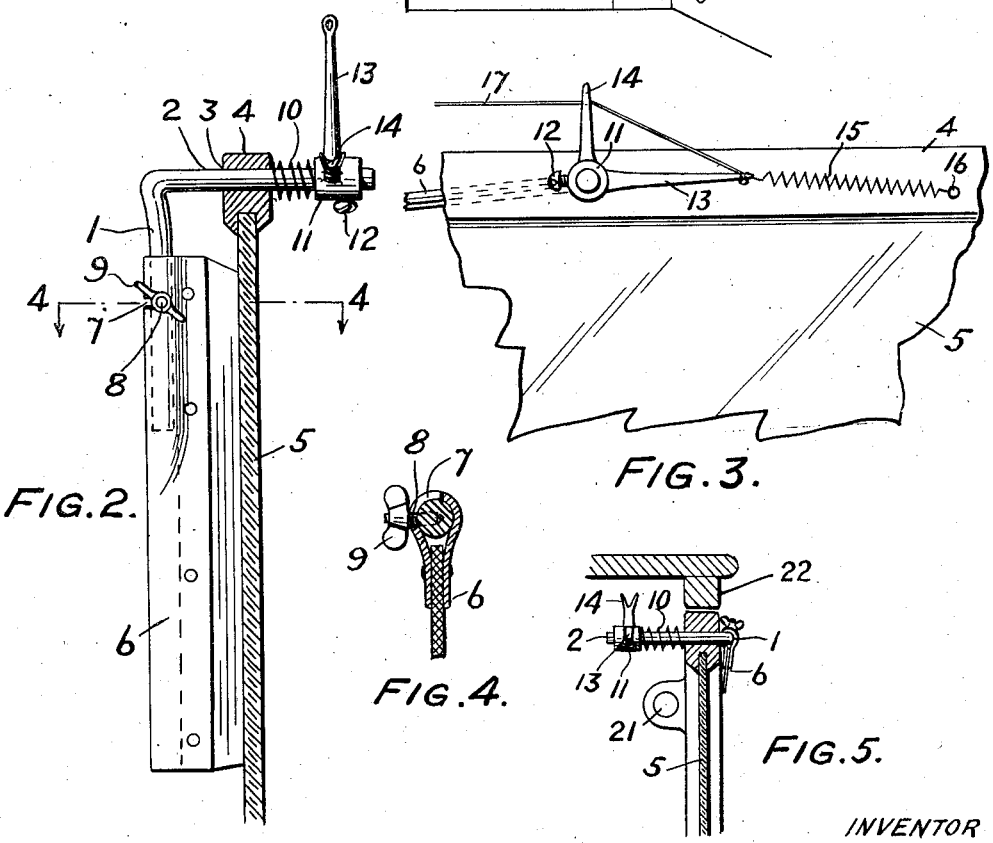
WITNESS:
Rob't R. Kitchel.
INVENTOR
Albert Dell
BY
Augustus B. Stoughton
ATTORNEY.

UNITED STATES PATENT OFFICE.

ALBERT DELL, OF PHILADELPHIA, PENNSYLVANIA, ASSIGNOR OF ONE-HALF TO THEODORE C. ULMER, OF GERMANTOWN, PHILADELPHIA, PENNSYLVANIA.

WINDSHIELD-CLEANER.

1,389,129.     Specification of Letters Patent.     Patented Aug. 30, 1921.

Application filed December 31, 1920. Serial No. 434,363.

*To all whom it may concern:*

Be it known that I, ALBERT DELL, a citizen of the United States, residing at Philadelphia, in the county of Philadelphia and State of Pennsylvania, have invented certain new and useful Improvements in Windshield-Cleaners, of which the following is a specification.

This invention relates to improvements in wipers or cleaners for window panes or transparent screens, employed as wind shields on automobiles or other vehicles, and of which the purpose is to clean the outer or front side of accumulating mist, rain, snow or frost, and thereby afford the driver free observation.

The principal objects of the present invention are, first, to provide for working the cleaner from a position convenient to the hand of the operator when seated in upright position on the seat so that he can work the cleaner with his left hand while using the right hand on the steering wheel and without having to lean over the steering wheel toward the wind shield; second, to provide a wind shield cleaner that can be readily attached to a wind shield and that, when so attached, may become permanent equipment which does not interfere with opening the wind shield; and third, to provide an efficient wind shield cleaner possessed of the above mentioned advantages and desirable features and yet consisting of comparatively few parts of simple construction.

To these and other ends hereinafter set forth the invention, stated in general terms, consists of a wind shield cleaner comprising the combination of a wiper arm adapted for arrangement outside of the top glass of the wind shield and having a right angularly disposed stud adapted to pass through and move endwise and turn in an opening provided through the top rail of the wind shield and to protrude inside of the latter, a squeegee turnably mounted at one of its side edges on said upper arm and having means for clamping it in operative and in inoperative positions, a compression spring mounted on the inwardly protruding portion of the stud and bearing on the inside of the top rail, a spring-retracted bell-crank lever adjustably mounted on the protruding part of the stud and bearing on said spring to set its tension on the squeegee, a pull connection attached to the bell crank and guided by a forked arm provided thereon, and guides for the pull connection to make it operable from the side of the driver's seat.

The invention further comprises the improvements to be presently described and finally claimed.

In the following description of the invention reference will be made to the accompanying drawings forming part hereof and in which—

Figure 1 is a perspective view of parts of the interior of a car or automobile showing an example of an application of the invention.

Fig. 2, is a detail view, drawn to an enlarged scale and principally in elevation, of parts of the mechanism.

Fig. 3, is a view drawn to an enlarged scale and showing, principally in elevation, other parts of the mechanism.

Fig. 4, is a section on the line 4—4, of Fig. 2, and

Fig. 5, is a view, partly in section, showing the device arranged for permitting opening of the upper part of the wind shield.

In the drawings 1 is a wiper-arm having a right angularly arranged stud 2, adapted to pass loosely through an opening 3, provided through the top-rail 4 of a wind shield 5, and to protrude inside of the latter. 6 is a squeegee turnably mounted at one of its edges on the wiper arm 1 and provided with means for clamping it in adjusted position. The slot 7, pin 8, and finger nut 9 are examples of such means. 10, is a compression spring mounted on the inwardly protruding portion of the stud 2 and reacting from the top rail 4. 11 is a bell crank lever adjustably mounted on the protruding part of the stud 2 and acting on the compression spring 10 to set the tension on the squeegee 6. The bell crank is shown as adjustable by means of the set screw 12, and as provided with a cord arm 13 and a forked arm 14 in order to give it a long throw. 15 is a retracting spring of which one end is attached to the bell crank and the other end to a pin 16 arranged on the top rail 4. 17 is a pull connection, wire or cord attached to the cord arm 13 and guided by the fork of the arm 14, and it leads to a point adjacent to the side of the driver's seat or to some convenient place. 18 are guides for the pull cord 17 and their location depends upon the type of car. However, one arrangement is shown in Fig. 1, and in it the handle fitting 19 is normally held up to a guide eye 20 by the tension of the spring 15 so that the cord is taut.

Obviously the device can be readily attached to or mounted on a car, since the principal requirement is to make two openings in the top rail 4 of the wind shield, one for the studs 2, and the other for the pin 16. The guides 18 can be readily positioned and attached, their exact location depending upon the style of car but it can be easily ascertained.

In use the driver, without leaning over the wheel or otherwise disturbing himself, simply pulls the handle 19 with his left hand, and this pull is transmitted to the bell crank 11 by the cord 17, which at first operates on the arm 14, as a lever and turns the bell crank and with it the arm 1 and squeegee 6 approximately one hundred and eighty degrees in one direction, and the spring 15 pulls them in the other direction upon release or slacking of the cord, and thus the squeegee cleans or wipes the wind shield, being held up thereto by the spring 10 with a pressure that can be adjusted by shifting the bell crank lever on the stud 2, and then clamping the bell crank lever to place by the set screw 12.

When it is desired to open the wind shield by turning it about its pivots 21, the squeegee can be turned out of the way in order to clear the part 22 of the top of the car by means of the finger nut 9. Upon comparing Fig. 5 showing the stud 2 and wiper arm 1 in innermost position, with Fig. 2 showing those parts in outermost position, it is evident that in Fig. 5 the shield can be opened at the bottom because all the elements clear the part 22, whereas in the position shown in Fig. 2, the stud would strike the part 22.

That modification can be made in details of construction and arrangement will be evident to those skilled in the art, hence the invention is not limited otherwise than as the prior art and the appended claims may require.

I claim:

1. A wind shield cleaner comprising the combination of a wiper arm having a right angularly arranged stud adapted to be mounted for turning and endwise motion in an opening provided through the top rail of a pivotal wind shield panel and to protrude inside of the latter, a squeegee hinged at its edge to said arm and adjustable into perpendicular and parallel positions with respect to the plane of the panel to permit of opening the wind shield, means for securing the squeegee in adjusted position, a compression spring mounted on the inwardly protruding portion of the stud and reacting inward from the top rail, a lever adjustably mounted on the protruding portion of the stud and acting on the compression spring to set the tension on the squeegee, and means for turning the lever.

2. A wind shield cleaner comprising the combination of a wiper arm provided with a squeegee and having a right angularly arranged stud mountable through an opening provided in the top rail of the wind shield, a cord arm and a forked arm provided on the stud, a retracting spring for the wiper arm, and a pull cord attached to the cord arm and guided by the forked arm, substantially as described.

3. A wind shield cleaner comprising the combination of a wiper arm having a right angularly arranged stud turnably and endwise movably mountable through the top rail of the pivotal panel of the wind shield, a spring urging the arm toward the face of the panel, a squeegee marginally hinged to the arm and turnable into positions parallel with and perpendicular to the plane of the panel, and means for securing the squeegee in adjusted position.

ALBERT DELL.